(12) United States Patent
Liang et al.

(10) Patent No.: US 7,324,444 B1
(45) Date of Patent: Jan. 29, 2008

(54) ADAPTIVE PLAYOUT SCHEDULING FOR MULTIMEDIA COMMUNICATION

(75) Inventors: Yi Liang, Palo Alto, CA (US); Bernd Girod, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 962 days.

(21) Appl. No.: 10/383,215

(22) Filed: Mar. 5, 2003

Related U.S. Application Data

(60) Provisional application No. 60/362,582, filed on Mar. 5, 2002.

(51) Int. Cl.
  *H04J 1/16* (2006.01)
  *H04J 3/14* (2006.01)
(52) U.S. Cl. .................. 370/230; 370/230.1; 370/235; 370/395.4
(58) Field of Classification Search .................. None
  See application file for complete search history.

(56) References Cited

U.S. PATENT DOCUMENTS

| | | | |
|---|---|---|---|
| 6,259,677 B1 * | 7/2001 | Jain | 370/252 |
| 6,646,986 B1 * | 11/2003 | Beshai | 370/230.1 |
| 6,665,732 B1 * | 12/2003 | Garofalakis et al. | 709/247 |
| 6,823,394 B2 * | 11/2004 | Waldvogel et al. | 709/231 |
| 7,039,048 B1 * | 5/2006 | Monta et al. | 370/389 |
| 7,050,465 B2 * | 5/2006 | Leon | 370/505 |
| 2002/0075857 A1 * | 6/2002 | LeBlanc | 370/352 |
| 2003/0061371 A1 * | 3/2003 | Deshpande | 709/232 |

OTHER PUBLICATIONS

Liang, Y.J., "Adaptive playout scheduling using time-scale modification in packet voice communications," May 2001, Proceedings IEEE Internation Conference on Acoustics, Speech, and Signal Processing, ICASSP-2001, 4 pages.*

* cited by examiner

*Primary Examiner*—Chirag G. Shah
(74) *Attorney, Agent, or Firm*—Crawford Maunu PLLC

(57) ABSTRACT

A method of adapting a playout schedule of a stream of media packets according to network and channel conditions includes (a) setting a playout schedule for a next packet i+1 of the stream upon receiving a current packet i; (b) computing a length of the current packet i based at least in part on a target playout schedule for the next packet i+1; (c) scaling packet i if necessary; (d) outputting packet i; and (e) updating the playout schedule for next packet i+1 based at least in part on the playout schedule and the length of current packet i.

20 Claims, 10 Drawing Sheets

---

1 Receive packet $i$;

2 Estimate and set the playout time for packet $i+1, \hat{t}_p^{i+1}$;

3 Calculate the desired length of packet $i$, $\hat{L}^i = \hat{t}_p^{i+1} - t_p^i$;

4 if $\hat{L}^i - L_0 >$ expansion threshold

5   Scale packet $i$ with target length min $(\hat{L}^i, L_{max})$;

6 elseif $\hat{L}^i - L_0 < -$compression threshold

7   Scale packet $i$ with target length max $(\hat{L}^i, L_{min})$;

8 else

9   Keep packet $i$ without modification;

10 endif

11 Output packet $i$ with actual length $\hat{L}^i$;

12 Update the playout time of packet $i+1, t_p^{i+1} = t_p^i + L^i$;

Algorithm for adaptive playout time adjustment with packet scaling.

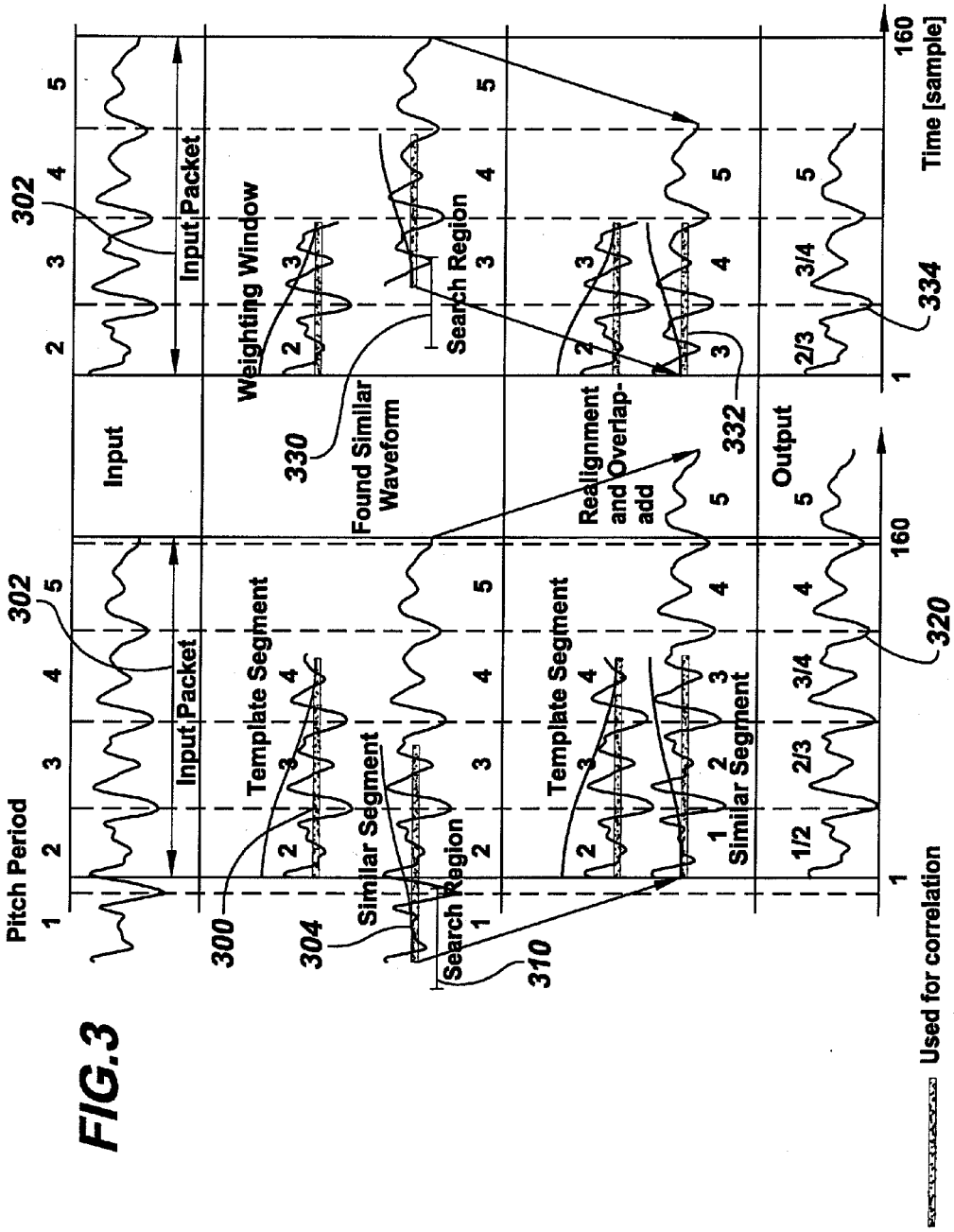

FIG. 4

1. Receive packet $i$;
2. Estimate and set the playout time for packet $i+1, \hat{t}_p^{i+1}$;
3. Calculate the desired length of packet $i$, $\hat{L}^i = \hat{t}_p^{i+1} - t_p^i$;
4. if $\hat{L}^i - L_0 >$ expansion threshold
5.     Scale packet $i$ with target length min $(\hat{L}^i, L_{max})$;
6. elseif $\hat{L}^i - L_0 < -$compression threshold
7.     Scale packet $i$ with target length max $(\hat{L}^i, L_{min})$;
8. else
9.     Keep packet $i$ without modification;
10. endif
11. Output packet $i$ with actual length $\hat{L}^i$;
12. Update the playout time of packet $i+1, t_p^{i+1} = t_p^i + L^i$;

Algorithm for adaptive playout time adjustment with packet scaling.

FIG.6

```
1  if packet i received
2    if packet i − 1 received
3      if packet i − 2 received
4        Output packet i − 1 with length $L_{i-1}$;
5      else
6        Extend packet i −1 with target length $1.3 L_0$;
7        Output packet i −1;
8      endif
9    endif
10 else
11   if packet i −1 received
12     Extend packet i −1 with target length $2L_0$;
13     Output packet i −1;
14   else
15     Repeat and Output packet i −2 using waveform repetition;
16   endif
17 endif
```

Algorithm for loss concealment.

ADAPTIVE PLAYOUT SCHEDULING FOR MULTIMEDIA COMMUNICATION

CROSS REFERENCE TO RELATED APPLICATIONS

This application claims priority from U.S. Provisional application Ser. No. 60/362,582 filed on Mar. 5, 2002, the specification of which is herein incorporated.

FIELD OF THE INVENTION

The invention relates generally to audio communication over a network and more particularly to real time communication over the Internet.

BACKGROUND OF THE INVENTION

The unreliable and stateless nature of today's Internet protocol (IP) results in a best-effort service, i.e., packets may be delivered with arbitrary delay or may even be lost. This quality of service (QoS) limitation is a major challenge for real-time voice communication over IP networks (VoIP). Since excessive end-to-end delay impairs the interactivity of human conversation, active error control techniques such as retransmission cannot be applied. Therefore, any packet loss directly degrades the quality of the reconstructed speech. Furthermore, delay variation (also known as jitter) obstructs the proper reconstruction of the voice packets in their original sequential and periodic pattern.

Considerable efforts have been made in different layers of current communication systems to reduce the delay, smooth the jitter, and recover the loss. On the application layer, receiver-based, passive methods have the advantage that no cooperation of the sender is required. Furthermore, these methods can operate independently of the network infrastructure.

The common way to control the playout of packets is to employ a playout buffer at the receiver to absorb the delay jitter before the audio is output. When using this jitter absorption technique, packets are not played out immediately after reception but held in a buffer until their scheduled playout time (playout deadline) arrives. Though this introduces additional delay for packets arriving early, it allows the playing of packets that arrive with a larger amount of delay. Note that there is a trade-off between the average time that packets spend in the buffer (buffering delay) and the number of packets that have to be dropped because they arrive too late (late loss). Scheduling a later deadline increases the possibility of playing out more packets and results in lower loss rate, but at the cost of higher buffering delay. On the other hand, it is difficult to decrease the buffering delay without significantly increasing the loss rate. Therefore, packet loss in delay-sensitive applications, such as VoIP, is a result of not only packets being dropped over the network, but also delay jitter, which greatly impairs communication quality.

Prior art attempts to solve this problem mainly focused on improving the trade-off between delay and loss, while trying to compensate the jitter completely or almost completely within talkspurts. By setting the same fixed time for all the packets in a talkspurt, the output packets are played in the original, continuous, and periodic pattern, e.g., every 20 ms. Therefore, even though there may be delay jitter on the network, the audio is reconstructed without any playout jitter. Other prior art solutions apply adaptive scheduling of audio and other types of multimedia, accepting a certain amount of playout jitter. However, in these methods, the playout time adjustment is made without regard to the audio signal and how continuous playout of the audio stream can actually be achieved is not addressed. As a result, the playout jitter that can be tolerated has to be small in order to preserve reasonable audio quality.

SUMMARY OF THE INVENTION

A method of adapting a playout schedule of a stream of media packets according to network and channel conditions includes (a) setting a playout schedule for a next packet i+1 of the stream upon receiving a current packet i; (b) computing a length of the current packet i based at least in part on a target playout schedule for the next packet i+1; (c) scaling packet i if necessary; (d) outputting packet i; and (e) updating the playout schedule for next packet i+1 based at least in part on the playout schedule and the length of current packet i.

BRIEF DESCRIPTION OF THE DRAWINGS

A complete understanding of the present invention may be gained by considering the following detailed description in conjunction with the accompanying drawings, in which:

FIG. 3 is graphical representation of a single packet Waveform Similarity Overlap-Add algorithm in accordance with an embodiment of the invention;

FIG. 4 is a schematic representation of an algorithm for adaptive playout time adjustment with packet scaling in accordance with an embodiment of the invention;

FIG. 6 is a schematic representation of an algorithm for loss concealment in accordance with an embodiment of the invention.

DETAILED DESCRIPTION OF THE INVENTION

Figure 1A:
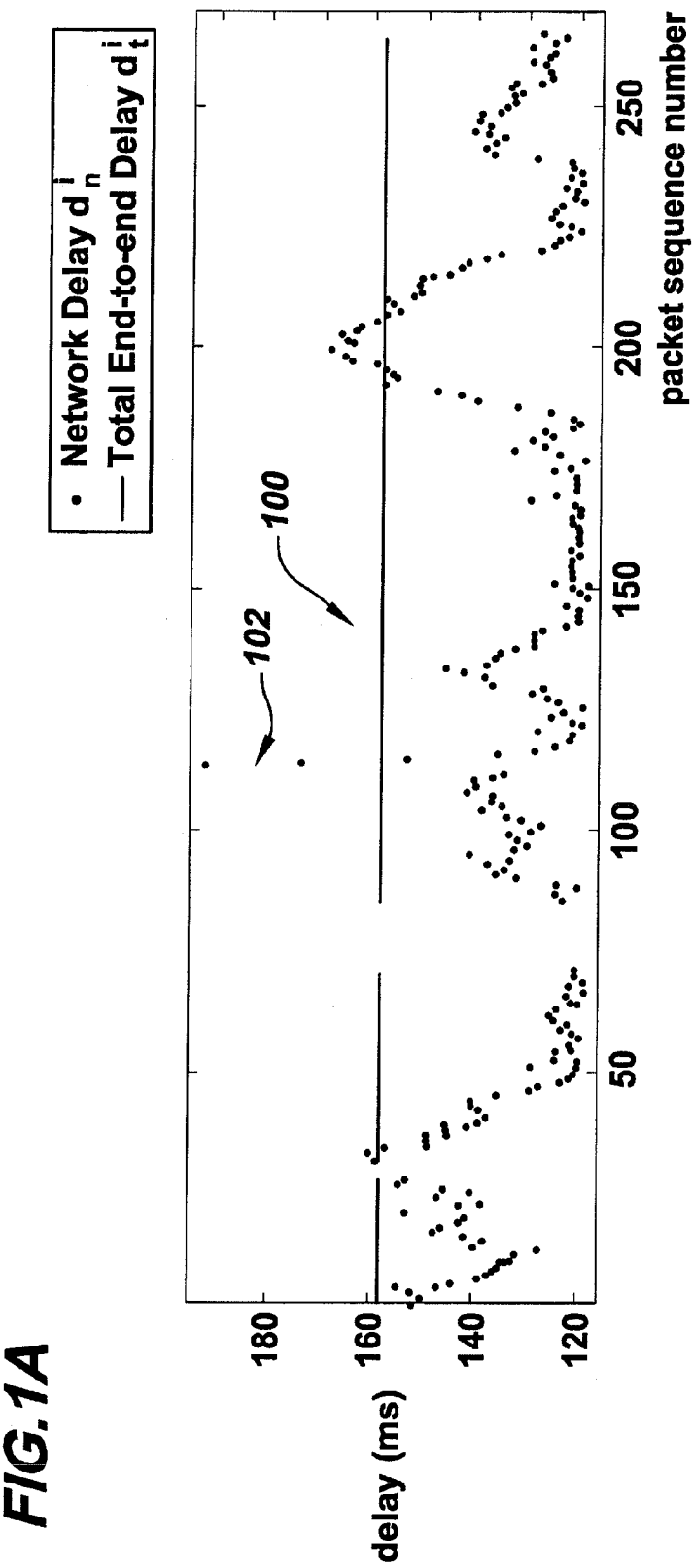
FIG. 1A is a graphical representation of a prior art playout scheduling scheme.
Figure 1B:
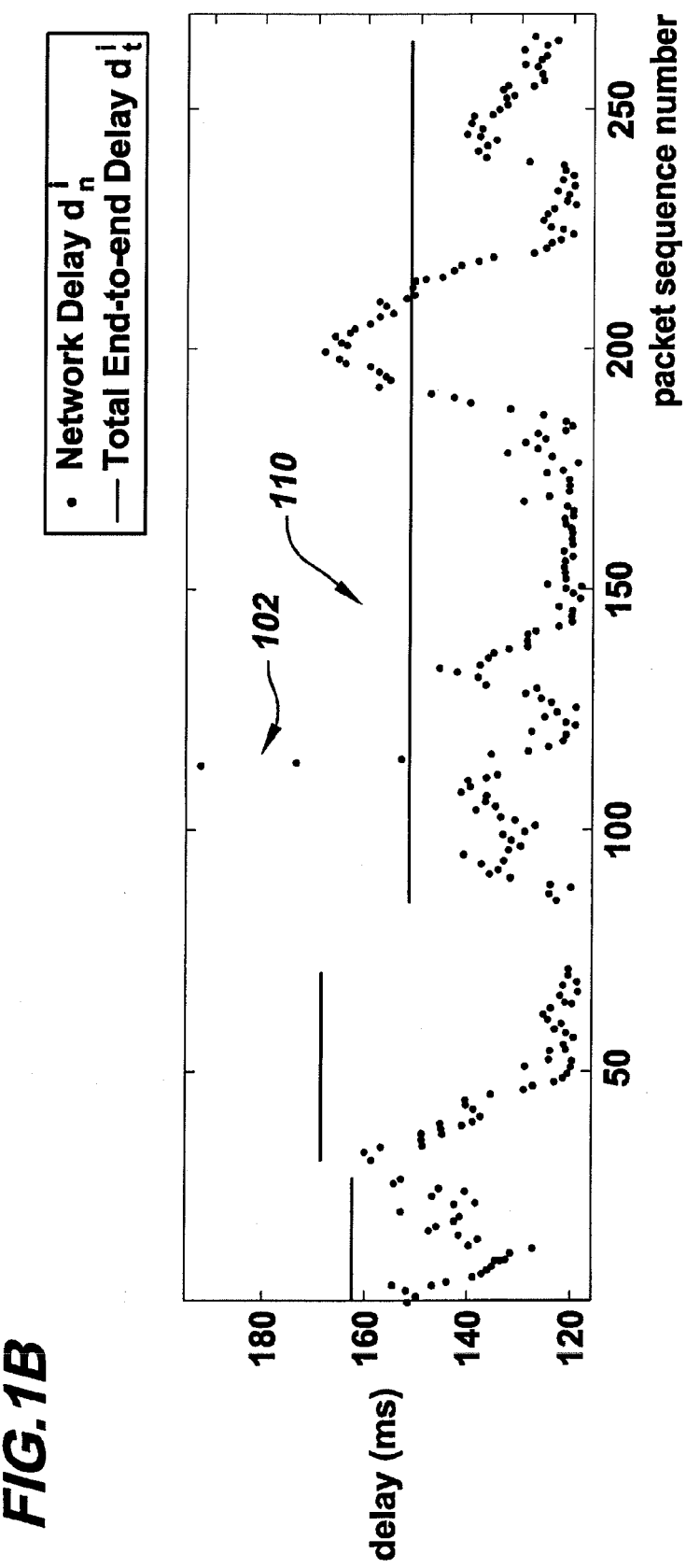
FIG. 1B is a graphical representation of a prior art playout scheduling scheme.
Figure 1C:
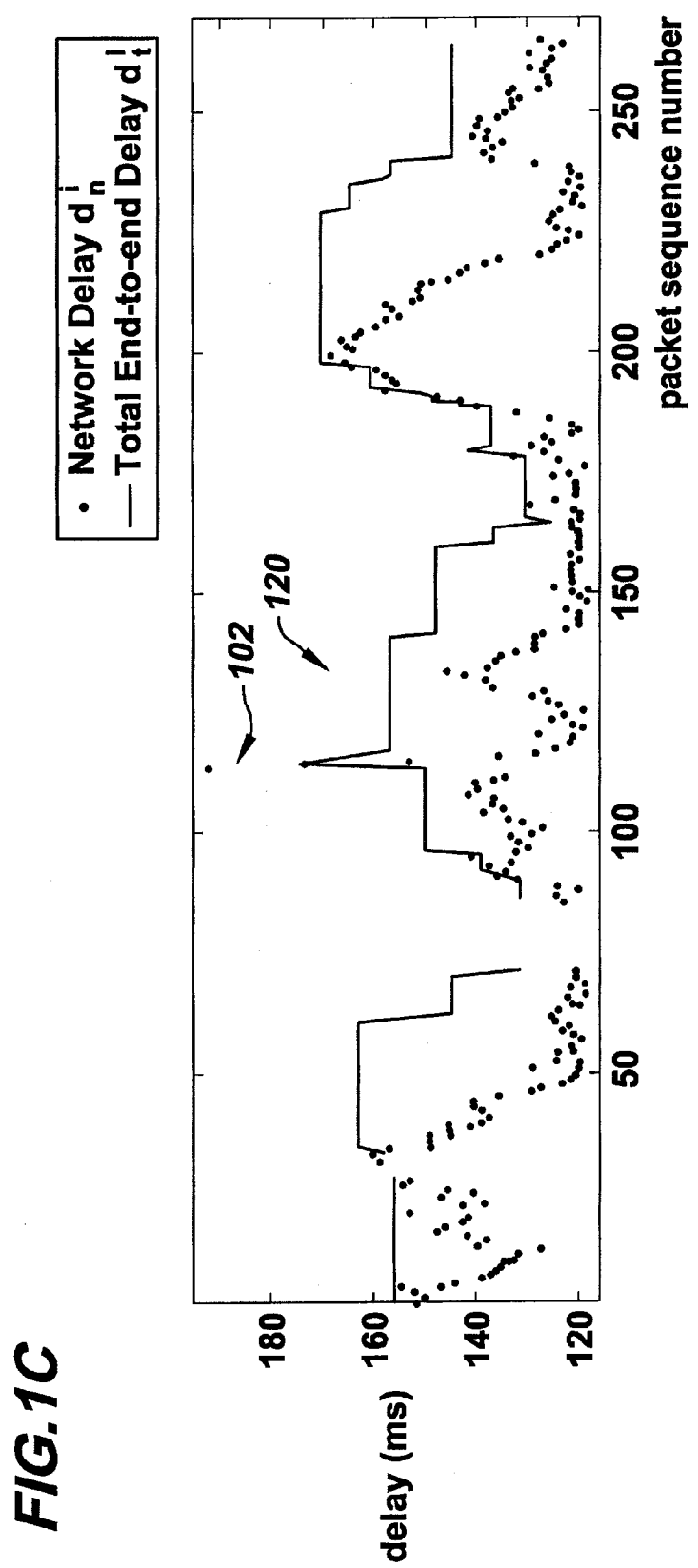
FIG. 1C is a graphical representation of a playout scheduling scheme in accordance with an embodiment of the invention.

With reference to FIGS. 1A, 1B and 1C, there are shown three different playout scheduling schemes generally designated 100, 110 and 120. The graphs 100, 110 and 120 show the delay of voice packets on the network as dots and the total delay as solid lines. When a later playout time is scheduled, the total delay increases as shown in FIG. 1A. Packets arriving after the playout deadline, i.e., dots above the line, are lost and have to be concealed. The task of a playout scheduling scheme is to lower the solid line (reduce the total delay) as much as possible while minimizing the number of dots above the line (minimize late loss).

The simplest method, shown in FIG. 1A, uses a fixed playout deadline for all the voice packets in a session. It is not very effective in keeping either the delay or the loss rate low enough in practice, because the statistics of the network delay change over time and a fixed playout time does not reflect this variation.

With improved playout algorithms, the network delay is monitored and the playout time is adaptively adjusted during silence periods. This is based on the observation that, for a typical conversation the audio stream can be grouped into talkspurts separated by silence periods. The playout time of a new talkspurt may be adjusted by extending or compressing the silence periods. This approach is shown in FIG. 1B. However, the effectiveness of this approach is limited when talkspurts are long and network delay variation is high within talkspurts. For example, the silence-dependent method is not able to adapt to the "spike" of high delay 102 within the third talkspurt at packets 113-115. As a result, several packets are lost in a burst causing audible quality degradation.

In a preferred embodiment of the invention, the playout is not only adjusted in silence periods but also within talkspurts. Each individual packet may have a different scheduled playout time, which is set according to the varying delay statistics. The results of the method of the invention are shown in FIG. 1C. For the same delay trace, the method of the invention is able to effectively mitigate loss by adapting the playout time in a more dynamic and reactive way. Note that the method of the invention requires the scaling of voice packets to maintain continuous playout and therefore introduces some amount of playout jitter. However, this flexibility allows for the reduction of the average buffering delay while reducing late loss at the same time. Hence, the trade-off between buffering delay and late loss is improved.

Figure 2A:
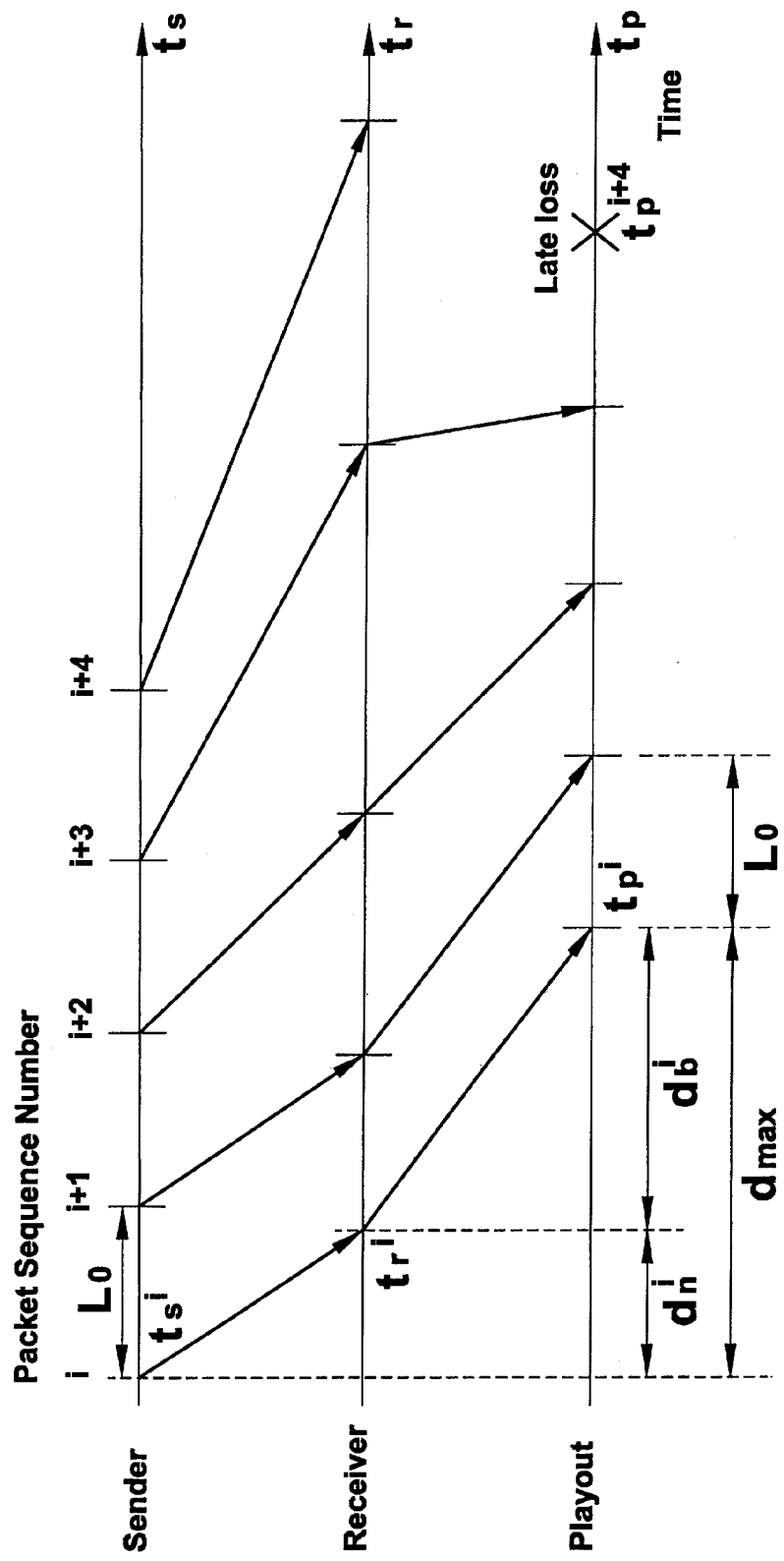
FIG. 2A is a graphical representation showing a constant length of packets of a prior art scheduling scheme.
Figure 2B:
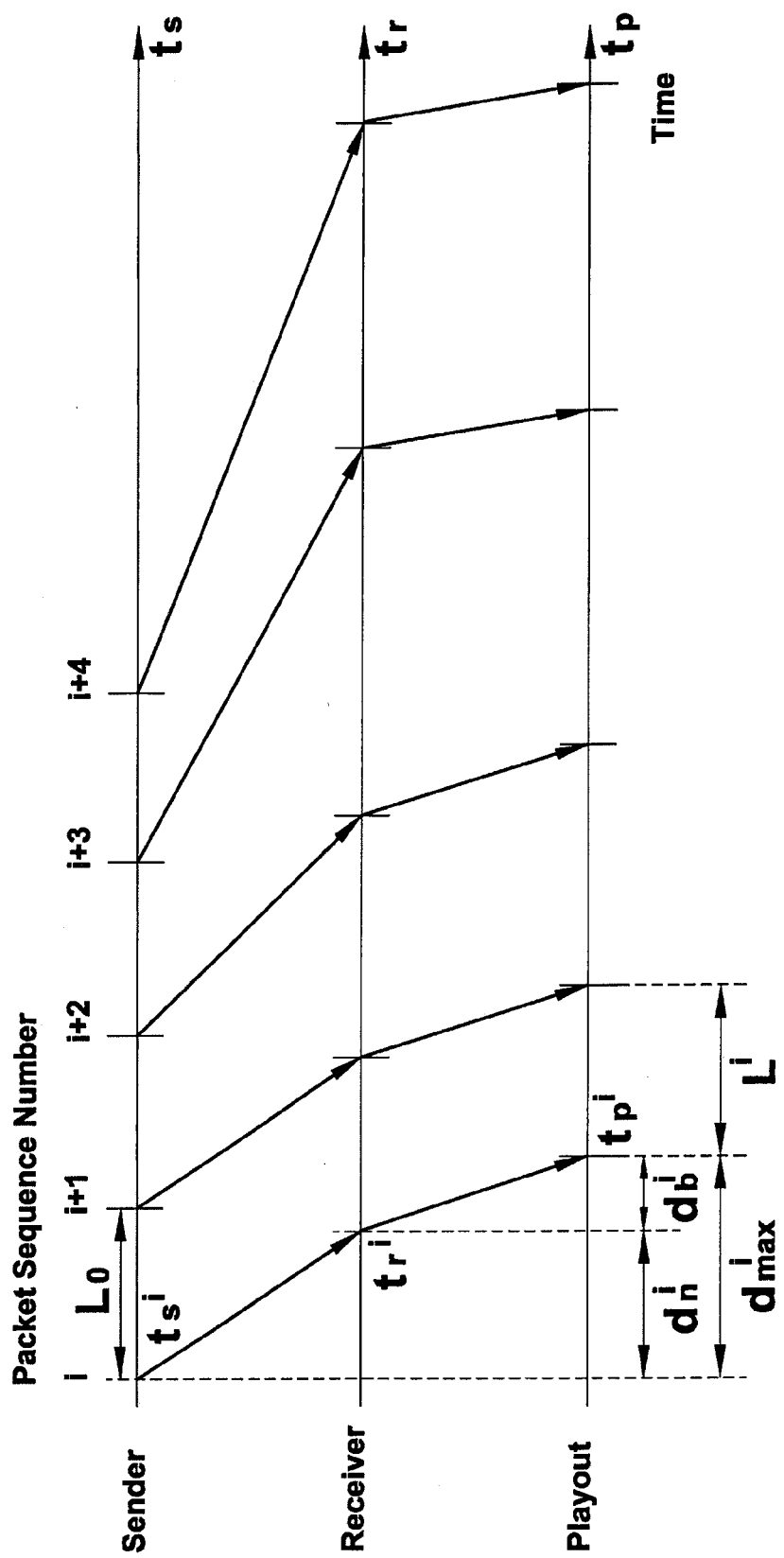
FIG. 2B is a graphical representation showing a variable length of packets of a playout scheduling scheme in accordance with an embodiment of the invention.

With reference to FIGS. 2A and 2B, the time when a packet is sent, received, and played out is denoted by $t_s^i$, $t_r^i$ and $t_p^i$ respectively. The index i=1, 2, . . . N denotes the packet sequence number, assuming N packets are sent in the stream. For packet voice, speech is usually processed and packetized into fixed size blocks and outgoing packets are generated periodically at a constant packetization time $L_0$, i.e., $t_s^{i+1} - t_s^i = L_0 = $ const. The buffering delay of packet i is then given by $d_b^i = t_p^i - t_r^i$, while the network delay $d_n^i$ is given by $d_n^i = t_r^i - t_s^i$. The total delay $d_t^i$, is the sum of the two quantities above, i.e., $d_t^i = d_n^i + d_b^i$. Note that this total delay does not include encoding and packetization time (a constant component of the end-to-end delay), as the method of the invention is involves packet transmission and speech playout. A packet i is lost during transmission and never reaches the receiver and is indicated by $d_n^i = \infty$. Hence, the set of received packets is given by $\mathcal{R} = \{i | t_r^i < \infty\}$.

The task of a particular scheduling scheme is to set the maximum allowable total delay $d_{max}^i$ (playout deadline) for each packet. Note that for the methods shown in FIGS. 1A and 1B, $d_{max}^i = d_{max} = $ const. for all i belonging to the session or the same talkspurt respectively. Therefore, the playout of packets at the receiver is fixed as illustrated in FIG. 2A, and the length of output packets is constant, i.e., $L_0 = t_p^{i+1} - t_p^i$. For the method of the invention, the adaptation is performed on a packet by packet basis. As a result, the length of packets that are played out may differ for each packet, i.e., $L^i = t_p^{i+1} - t_p^i$, where $L^i$ is the achieved length (in time) of audio packet i. The resulting adaptive playout is illustrated in FIG. 2B. The required scaling of voice packets is further described herein.

When evaluating different scheduling schemes two quantities are of interest. The first one is the average buffering delay, which is given by $$d_b = \frac{1}{|\mathcal{P}|} \sum_{i \in \mathcal{P}} (d_{max}^i - d_n^i),$$

where $\mathcal{R} = \{i | t_p^i > t_r^i\}$ is the set of played packets, and $|\mathcal{R}|$ denotes the cardinality of this set. The second quantity is the associated late loss rate, given by $\epsilon_l = (|\mathcal{R}| - |\mathcal{R}|)/N$. These two metrics also reflect the above mentioned trade-off between loss and delay and are used herein to compare the performance of different playout scheduling algorithms.

The link loss rate is defined as $\epsilon_n = (N - |\mathcal{R}|)/N$. The total loss rate is the sum of the late loss rate and the link loss rate, i.e., $\epsilon = \epsilon_n + \epsilon_l$. The burst loss rate, denoted by $\epsilon_b$, quantifies the burstiness of the loss. Burst losses are considered separately because they are more difficult to conceal and impair sound quality more severely. Defining the set of packets with two consecutive losses as $\mathcal{B} = \{i | t_p^i < t_r^i, t_p^{i+1} > t_r^{i+1}\}$, the burst loss rate is given by $\epsilon_b = |\mathcal{B}|/N$.

As described above, adaptive playout can only be achieved when individual voice packets can be scaled without impairing speech quality. The scaling of voice packet is realized by time-scale modification based on the Waveform Similarity Overlap-Add (WSOLA) algorithm, which is an interpolation-based method operating entirely in the time domain. This technique, described in W. Verhelst and M. Roelands, "An overlap-add technique based on waveform similarity (WSOLA) for high quality time-scale modification of speech," in Proc. ICASSP 93, April 1993, vol II, pp. 554-557 and incorporated herein, is used to scale long audio blocks. The technique is described in modified form for loss concealment by expanding a block of several packets in A. Stenger, K. Ben Younes, R. Reng, and B. Girod, "A new error concealment technique for audio transmission with packet loss," in Proc. European Signal Processing Conference, September 1996, vol. 3, pp. 1965-68 and in H. Sanneck, A. Stenger, K. Ben Younes, and B. Girod, "A new technique for audio packet loss concealment," in IEEE GLOBECOM, November 1996, pp. 48-52 and incorporated herein. The basic idea of WSOLA is to decompose the input into overlapping segments of equal length, which are then realigned and superimposed to form the output with equal and fixed overlap. The realignment leads to a modified output length. For those segments to be added in overlap, their relative positions in the input are found through the search of the maximum correlation between them, so that they have the maximum similarity and the superposition will not cause any discontinuity in the output. Weighting windows are applied to the segments before they are superimposed to generate smooth transitions in the reconstructed output. For speech processing, WSOLA has the advantages of maintaining the pitch period, which results in improved quality compared to resampling.

To scale a voice packet, a template segment 300 of constant length in the input 302 is selected, and then a search for a similar segment 304 that exhibits maximum similarity to the template segment 300 is conducted. The start of the similar segment 304 is searched in a search region 310, as is shown in FIG. 3 When working on a single packet, the search for the similar segment 304 is more constrained, since the realignment of the similar segment 304 must be done in units of pitch periods and there are fewer pitch periods in one short packet. For a 20 ms packet, depending on the speaker's gender and voice pitch, there could be fewer than two pitch periods included, which makes it difficult to extract the target segments with similarity. To overcome this problem, the WSOLA algorithm may be modified to decrease the segment length for correlation calculation, and to position the template segment 300 at the beginning of the input packet, as shown in FIG. 3. For expanding short packets, the search region 310 may be moved for a first similar segment to the prior packet in order to have a larger range to look for similar waveforms. In FIG. 3, although the input packet 302 starts in Pitch Period 2, the similar segment 304 is found within Pitch Period 1. Although the prior packet might already be played out at the time of scaling, similar waveforms can still be extracted from it to construct new output without delaying the prior packet. Once the similar segment 304 is found, it is weighted by a rising window and the template segment 300 weighted by a symmetric falling window. The similar segment 304 followed by the rest of the samples in the packet is then shifted and superimposed with the template segment 300 to generate the output 320. The resulting output 320 is longer than the input due to the relative position of the similar segment 304 found and the shift of the similar segment 304, as is shown in FIG. 3. The amount of expansion depends on the position and the size of the defined search region 310.

In FIG. 3, complete pitch periods in the waveform are separated by vertical dashed lines and marked with sequential numbers. For example, one can observe from the output 320 that one extra pitch period is created and added as a result of realignment and superposition of the extracted segments from the input 302. However, the extra pitch period is not just a simple replication of any pitch period from the input 302, but the interpolation of several pitch periods instead. For the output 320, the first three pitch periods are the weighted superposition of Pitch Periods 1/2, 2/3, and 3/4, respectively. This explains why the sound quality using time-scale modification is better than that of pitch repetition. The same is true for compressing a packet, where the information carried by a chopped pitch period is preserved and distributed among the remaining ones. However, the single-packet operation described above has the same advantage as pitch repetition in terms of no added delay.

The operations of searching for a similar segment 304 and extending the packet by multiple pitch periods, as described above, constitute one iteration of the method of the invention. If the output speech has not reached the desired length after such operations, additional iterations are performed. In a subsequent iteration, a new template segment of the same length is defined that immediately follows the template in the last iteration. All the defined template segments and the remaining samples following the last template in the input should cover the entire output with the target length. The total number of defined template segments, and hence the number of iterations used here is $$\left\lfloor \frac{\hat{L}^i}{W} \right\rfloor - 1$$

where $\lfloor x \rfloor$ represents the greatest integer number that is smaller than or equal to x, $\hat{L}^i$ is the target length of the output, and W is the length of a segment (either template segment or similar segment).

Packet compression is done in a similar way, as depicted in FIG. 3. The only difference is that the search region 330 for the similar segment 332 should not be defined in the prior packet in order to generate an output 334 shorter in length. A successful packet compression requires that a packet contains more than one pitch, which limits the minimum length of the packet that can be compressed. However, a common packet length, such as 20 ms, is usually sufficient since pitch values below 100 Hz are not very frequent in speech signals. If, for some cases, packet compression cannot be performed, it is uncritical to delay the compression to later packets, which will be further discussed herein.

Comparing the input 302 and output waveforms 320, 334 in FIG. 3, it becomes obvious that packet scaling method preserves the pitch frequency of the input 302. Only the packet length and hence the rate of speech are altered. Subjective listening tests presented herein show that infrequent scaling of the packets does not degrade the speech quality, even if the scaling ratio is occasionally high. Note that the packet scaling method is entirely voice codec independent. If any kind of codec should be used, the operations can be applied on the PCM output of the decoder.

One advantage of working with a short packet is that the input is divided into fewer template segments so that typically only one or two iterations will yield the output with the desired length. Another important feature of the packet scaling method apparent in FIG. 3 is that the beginning and the end of each packet are not altered. As a result, when concatenating modified packets, no overlap is needed to obtain smooth transitions. Hence, packets can be modified independently and sent to the output queue back to back. This type of operation is ideally suited for a highly adaptive playout scheduler.

Since the scaling of packets has to be performed in integer multiples of pitch periods, it is not possible to achieve arbitrary packet lengths and playout times as would be desirable for adaptive playout. In other words, the actual resulting packet length, $L^i$, after single packet WSOLA can only approximate the required target length, $\hat{L}^i$. For this reason, expansion and compression thresholds are defined. Only if the desired playout time precedes the currently scheduled playout time by more than the compression threshold, is a packet compressed to speed up the playout. The compression threshold is usually greater than a typical pitch period. The same strategy is used for the expansion of a packet, except that the two thresholds are asymmetric. To prevent unnecessary late loss, compression is applied conservatively enough to avoid dropping the playout time below a target. On the other hand, smaller expansion thresholds are defined, which might be smaller than a pitch period. In this way, the packet is expanded and the playout is slowed down in order to accommodate a sudden increase of the network delay. This asymmetry results in a hysteresis that can be observed in FIG. 1C, where increased network delay is followed more closely than reduced network delay. The introduced hysteresis also results in smoothed playout jitter.

To avoid extreme scaling, maximum and minimum target packet lengths are defined and denoted by $L_{max}$ and $L_{min}$ respectively. In the simulations described herein, $L_{max}=2.3L_0$ and $L_{min}=0.3L_0$ are used. However, during silence periods, the amount of adjustment made for the playout schedule is not limited by $L_{max}$ or $L_{min}$, so that the playout schedule can be modified.

The general procedure of playout schedule adjustment is described by the algorithm in FIG. 4. The operation described by line 2, the setting of the playout time, will be discussed in full detail herein.

Due to the real-time nature of the packet scaling operation and low-delay requirement, the algorithm has to be computationally efficient. Hence, the complexity of single packet WSOLA ins analyzed. Denoting the length of a segment in samples by W, and the length of search region in samples by R, in one iteration, the number of operations for correlation calculation is WR multiplications, plus 2W multiplications for windowing. For a typical 20 ms packet sampled at 8 kHz, if limiting the maximum scaling ratio to be $L_{max}/L_0=2.3$, there would be at most 3 iterations in total according to $$\left\lfloor \frac{\hat{L}^i}{W} \right\rfloor - 1.$$

Considering typical values of W=80 and R=100, and 3 iterations, the maximum complexity of scaling one packet is approximately 24,000 multiplications and 24,000 additions. Based on experiments on a 733 MHz Pentium III machine, this operation requires approximately 0.35 ms. In practice, scaling by $L_{max}/L_0$ is carried out infrequently, and the average load will be significantly lower than the peak load estimated above.

The basic operation of the playout scheduler is to set the playout time $t_p$ for each packet. Before packet i can be played out the length $L^i$ must be computed to perform the required scaling. According to $L^i=t_p^{i+1}-t_p^i$, this implicitly sets the playout time of the next packet to $t_p^{i+1}=t_p^i+L^i$. Therefore, in order to play packet i, the arrival and playout time of packet i+1 must be estimated, or equivalently, the network delay $d_n^{i+1}$, which is Step 2 in FIG. 4. If the delay of the next packet is correctly estimated, the next packet should arrive in time and be ready by the end of playback of the current packet. A good estimation of the network delay is therefore an important component for adaptive playout scheduling. Known techniques for delay estimation include linear recursive filtering with stochastic gradient algorithms, histogram based approaches, normal approximation, and event-counting. The method of the invention uses the delay of past packets and bases the estimation on its order statistics in order to adapt the playout schedule to the network variations in a more reactive way.

According to an embodiment of the invention, the delays are collected for a sliding window of the past w packets. A threshold of the total delay for the next packet, $d_{max}^{i+1}$, is defined according to the user-specified loss rate, $\hat{\epsilon}_l$. The next packet must arrive before that deadline in order to be played out. The determination of $d_{max}^{i+1}$ is described in detail as follows.

The network delay of past w packets recorded is $d_n^{i-w+1}$, $d_n^{i-w+2}$, ..., $d_n^i$. Its order statistics, or the sorted version of $d_n^{i-w+1}$, $d_n^{i-w+2}$, ..., $d_n^i$ are denoted as $D^1, D^2, \ldots D^w$, where $D^1 \leq D^2 \leq \ldots \leq D^w$. The probability that network delay $d_n$ is no greater than the rth order statistic $D^r$ is $F(D^r)=P(d_n \leq D^r)$, r=1, 2, ..., w. It has been shown that $$\varepsilon(F(D^r)) = \frac{r}{w+1}, r = 1, 2, \ldots, w,$$

which is the expected probability that a packet with the same delay statistics can be received by $D^r$.

The method of the invention extends $D^1 \leq D^2 \leq \ldots \leq D^w$ by adding an estimate of the lowest possible delay $D^0=\max(D^1-2s_{d_n}, 0)$, and the maximum delay $D^{w+1}=D^w+2s_{d_n}$, where $s_{d_n}$ is the standard deviation of the sample $d_n^{i-w+1}$, $d_n^{i-w+2}$, ..., $d_n^i$, such that the extended order statistics $D^0 \leq D^1 \leq \ldots \leq D^w \leq D^{w+1}$ is obtained and $$\varepsilon(F(D^r)) = \frac{r}{w+1}, r = 0, 1, \ldots, w+1.$$

This solves the problem that the expected playout probability in $$\varepsilon(F(D^r)) = \frac{r}{w+1}, r = 1, 2, \ldots, w$$

cannot reach beyond $$\frac{w}{w+1}$$

or below $$\frac{1}{w+1}.$$

Given a user-specified loss rate $\hat{\epsilon}_l$, the index $\hat{r}$ and corresponding delay $D^{\hat{r}}$ that achieves $\hat{\epsilon}_l$ with the smallest possible delay is sought. Put differently, the greatest $D^{\hat{r}}$ such that $\varepsilon(F(D^r)) \leq 1-\hat{\epsilon}_l$ is sought. From $$\varepsilon(F(D^r)) = \frac{r}{w+1}, r = 1, 2, \ldots, w,$$

the corresponding index is given by $\hat{r}=\lfloor (w+1)(1-\hat{\epsilon}_l) \rfloor$. Given this index, the playout deadline $d_{max}^{i+1}$ can be approximated by the interpolation between $D^{\hat{r}}$ and $D^{\hat{r}+1}$ as $d_{max}^{i+1}=D^{\hat{r}}(D^{\hat{r}+1}-D^{\hat{r}})[(w+1)(1-\hat{\epsilon}_l)-\hat{r}]$.

Note that, due to the heavy-tailed nature of network delay, the maximum possible value of the delay $d_n^{i+1}$ cannot be determined from a limited sample space. Hence, the statistic obtained from the last w samples is often too optimistic. By adding an estimate of the maximum delay, $D^{w+1}$, as shown by $D^{w+1}=D^w+2s_{d_n}$, the sample becomes more conservative. A higher estimate results in higher buffering delay and therefore lower loss rate.

A more accurate estimation of the delay distribution is also possible by using a larger window size w. However, this has the disadvantage that the window-based estimator will adapt less responsively to the varying network delay. Hence, the choice of w determines how fast the algorithm is in adapting to the variation and is subject to a trade-off between accuracy and responsiveness. The experimental values are described herein.

One important feature of the history-based estimation is that the user can specify the acceptable loss rate, $\hat{\epsilon}_l$, and the algorithm automatically adjusts the delay accordingly. Therefore, the trade-off between buffering delay and late loss can be controlled explicitly. In practice, loss rates of up to 10% can be tolerated when good loss concealment techniques are employed, as discussed in more detail herein.

From network delay traces, it is common to observe sudden high delays ("spikes") incurred by voice packets, as packets 113-115 show in FIGS. 1A, 1B and 1C. Different ways of detecting such spikes and adjusting the playout time accordingly are known in the prior art. However, in the prior art, due to the nature of silence-dependent time adjustment and the fact that the spike period is usually very short and unpredictable, the chance of being able to adjust the playout time when a spike is detected is very small as shown in FIG. 1B. As a result, burst packet loss resulting from spike delays cannot be effectively alleviated.

Delay spikes usually occur when new traffic enters the network and a shared link becomes congested, in which case past statistics are not useful to predict future delays. In an embodiment of the invention, a rapid adaptation mode is implemented when the present delay exceeds the previous one by more than a threshold value. In rapid adaptation mode, a first packet with unpredictable high delay has to be discarded. After that, the delay estimate is set to the last "spike delay" without considering or further updating the order statistics. Rapid adaptation mode is switched off when the delays drop down to the level before the mode is in force and the algorithm returns to its normal operation reusing the state of order statistics before the spike occurred. This rapid adaptation is only possible when individual packets are scheduled and scaled as in our scheme. It is often helpful to avoid burst loss as illustrated in FIG. 1C.

Even with adaptive playout scheduling a certain number of packets will arrive after their scheduled playout time or be lost over the network. To recover the lost information as well as possible, various loss recovery techniques have been investigated in the past. A survey studying different trade-offs among algorithm delay, voice quality and complexity is presented in C. Perkins, O. Hodson, and V. Hardman, "A survey of packet loss recovery techniques for streaming audio," IEEE Network, vol. 12, no. 5, pp. 40-48, September-October 1998 and incorporated herein. In an embodiment of the invention a method that is based on the packet scaling operations is described in herein. It is a hybrid of time-scale modification and waveform substitution, which is used to conceal both late loss and link loss by exploiting the redundancy in the audio signal. The good sound quality by time-scale modification has already been demonstrated in the prior art. However, in the prior art an algorithm delay of 2-3 packet times is introduced by using one-sided information and working on a block of 2-3 packets. The method of the invention takes advantage of scaling one packet and using two-sided information by working together with adaptive playout scheduling. This concealment method reduces the delay to one packet time and results in better voice quality. Waveform repetition is built into the method of the invention to repair burst loss. Waveform repetition does not introduce any algorithm delay other than a short merging period, however it does not provide as good a sound quality as time-scale modification.

Figure 5A:
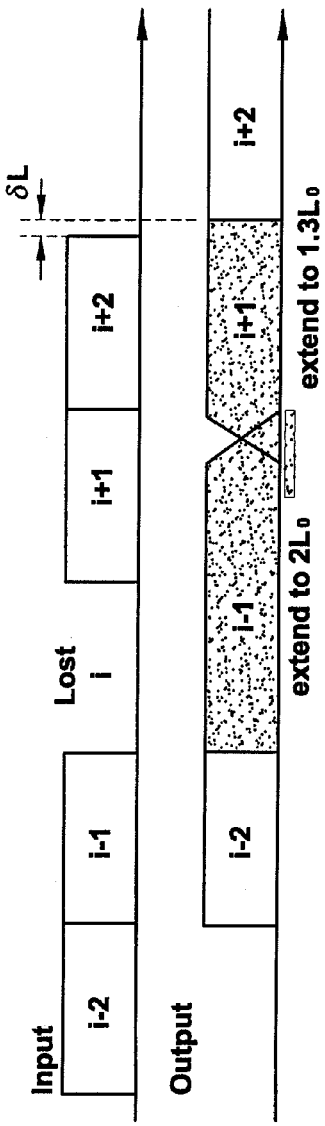
FIG. 5A is a graphical representation of a loss concealment scheme for a single loss in accordance with an embodiment of the invention.
Figure 5B:
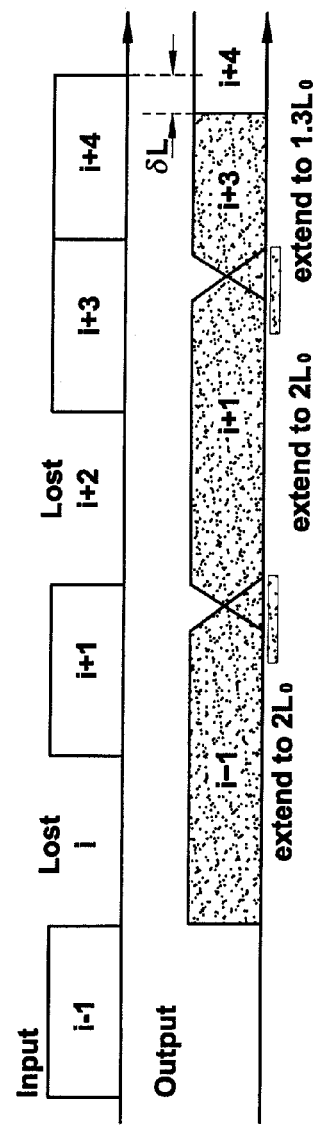
FIG. 5B is a graphical representation of a loss concealment scheme for an interleaved loss in accordance with an embodiment of the invention.
Figure 5C:
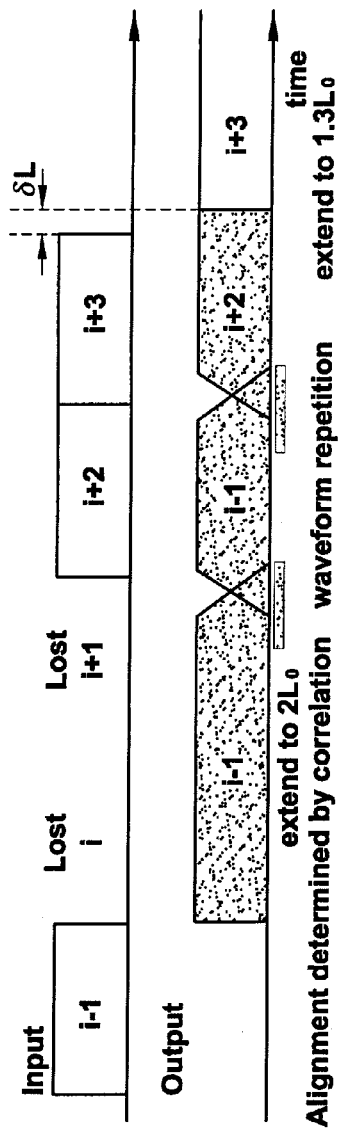
FIG. 5C is a graphical representation of a loss concealment scheme for a consecutive loss in accordance with an embodiment of the invention.

The concealment method of the invention is illustrated in FIGS. 5A, 5B and 5C. For the following analysis the processing time of packet scaling is ignored and it is assumed that a packet can be scaled instantly and then played out. At the time packet i is assumed lost, its prior packet i−1 is extended with a target length of $2L_0$ and then played out. Packet i−1 is buffered and delayed by one packet time while the receipt status of packet i is received. Packet i is assumed lost if it is not received by the time packet i−1 is to be played out, and the concealment starts at that moment. Further operation depends on the loss pattern. If packet i is the only packet lost (packets i+1 and i+2 are received by their deadlines), packet i+1 is extended with a target length of $1.3L_0$. Before concatenating the expanded packets i−1 and i+1, a search of similar waveform within a limited region (about half a pitch period in length) is performed to obtain the merging position. As is shown in FIG. 5A, small segments found from either side are then weighted by falling and rising windows before merging. In this way discontinuities are avoided and better sound quality compared to a fixed merging position of the prior art is obtained. The total expansion of packets i−1 and i+1 will cover or, most likely, exceed the gap resulting from the lost packet. Note that uncertainty about the length of the concatenated packets remains because of the undetermined output size by WSOLA and the described merging procedure. The resulting length of modified packets is then $L^{i-1}+L^{i+1}-L_{merge}$, and the playout time of packet i+2 is $t_p^{i+2}=t_p^{i-1}+L^{i-1}+L^{i+1}-L_{merge}$. Note that a successful concealment should have $t_p^{i+2}>t_r^{i+2}$. In general, $t_p^{i+2}$ will not match the desired playout time. Therefore, the actual playout is likely to be either ahead or behind the scheduled playout by a small difference $\delta L$, as illustrated in FIGS. 5A, 5B and 5C. However, this can be corrected by the adaptive playout algorithm by scaling the following packets. Therefore, the use of time-scale modification for adaptive playout as well as loss concealment allows additional flexibility and integrates nicely into the overall system.

Besides single packet loss, the method of the invention can also handle interleaved loss patterns, or bursts loss, as shown in FIGS. 5B and 5C respectively. Compared to concealment techniques discussed in the prior art, significant improvement can be achieved for these cases. The main advantage of the method of the invention is that it can detect such patterns and automatically adjust the amount of scaling. In either case, when packet i is lost, the scaling of packet i−1 follows the same procedure depicted in FIG. 5A since the future loss pattern is unknown at time i. In FIG. 5B, once packet i+2 is determined to be lost, packet i+1 is scaled with a target length of $2L_0$ instead of $1.3L_0$, to cover the gap resulting from the second loss. In FIG. 5C, where packets i and i+1 are lost, the waveform of the scaled packet i−1 is repeated in order to conceal burst loss. In both cases, search of similar waveforms is performed for merging, and adaptive playout time adjustment is used on the following packets if necessary.

Finally, the concealment of two or more consecutive packet losses is illustrated in FIG. 5C. When more than two consecutive losses occur, waveform repetition is used for a maximum of three times, before the mechanism stops to generate output and resets the playout schedule. Due to the replicating nature of waveform repetition, burst loss degrades voice quality most severely, even if after being concealed. Although there exist prior art reconstruction schemes using interleaving or FEC to protect data from burst loss, those approaches are made at the cost of higher delay. As shown in herein, one particular advantage of adaptive playout scheduling is its capability of reducing the loss of consecutive packets, i.e., burst loss.

The algorithm for the proposed loss concealment method is summarized in FIG. 6. This method introduces a delay of one-packet time, but offers good voice quality and handles high loss rates of various patterns. Note that when used together with adaptive playout scheduling, the playout times in FIG. 4 should be offset by one-packet. However, since other concealment methods could be used instead, the adaptive playout scheduling algorithm described in FIG. 4 is treated in a more general form without reflecting any specific loss concealment mechanism. Furthermore, if a speech codec is used for transmission that has an internal loss concealment algorithm that operates at a lower delay, it might be advantageous to use it instead of the algorithm proposed here. The option of switching off the proposed concealment mechanism is open. In general, however, the proposed scheme (including adaptive playout scheduling and loss concealment) can be well integrated with any kind of speech codec.

The performance of the three playout scheduling schemes shown in FIGS. 1A, 1B and 1C will now be compared. The comparison is based on packet delay traces collected from the Internet by transmitting voice streams between hosts at four different geographic locations. The four Internet links from which the data was collected were Chicago, Germany, MIT, and China and the data sequences collected from these links are referred as Traces 1-4 respectively in FIG. 7. The local machine was located at Stanford University, with an IP address of 171.64.90.63. The measured data is one-way delay of UDP packets with payload size of 160 bytes, reflecting 20 ms G.711 coded voice packet in 8-bit quantization. Each trace runs for 180 seconds, consisting of delay data of 9000 packets. The clocks of the local and remote hosts are synchronized using the Network Time Protocol The metrics used for the comparison between different algorithms are the late loss rate, $\epsilon_l$, and the average buffering delay, $d_b$, as defined herein. These two quantities are of major concern since they are directly associated with the subjective quality, and they are the receiver-controllable components of the total loss rate and total delay respectively.

In the experiments, receiving and playing out of the voice packets are simulated offline using the three playout scheduling schemes under comparison. Delay traces and voice packets are read in from recorded files and different playout algorithms are executed to calculate the playout time, scale voice packets if necessary, and generate output audio. In this way, the playout scheduling schemes are compared under the same conditions. After the simulation of a whole trace, the loss rate and average buffering delay are calculated and plotted in FIG. 7. The continuous curves with different loss rate and buffering delay are obtained by varying the control parameters of each particular playout scheduling scheme, e.g., the user-specified loss rate determining the playout deadline in the playout scheduling scheme of the invention. The variation of the control parameter therefore illustrates the achievable trade-off between $\epsilon_l$ and $d_b$ that can be achieved with each playout scheduling scheme.

The trade-off of using different window size w is discussed herein. For the playout scheduling scheme shown in FIG. 1B w=300 was chosen, and w=35 was chosen for the playout scheduling scheme shown in FIG. 1C, in order to achieve optimal performance in terms of delay-loss trade-offs. The use of a smaller window size for playout scheduling scheme shown in FIG. 1C is more appropriate due to the more responsive nature of the playout scheduling scheme shown in FIG. 1C in adapting to the network delay variation. For scheduling scheme shown in FIG. 1B, a bigger window size provides better performance, since the adaptation is performed less frequently and the short-term history may result in a "myopic view" of the past. In summary, the window size is optimized for each scheduling scheme based on the collected trace data.

Figure 7:
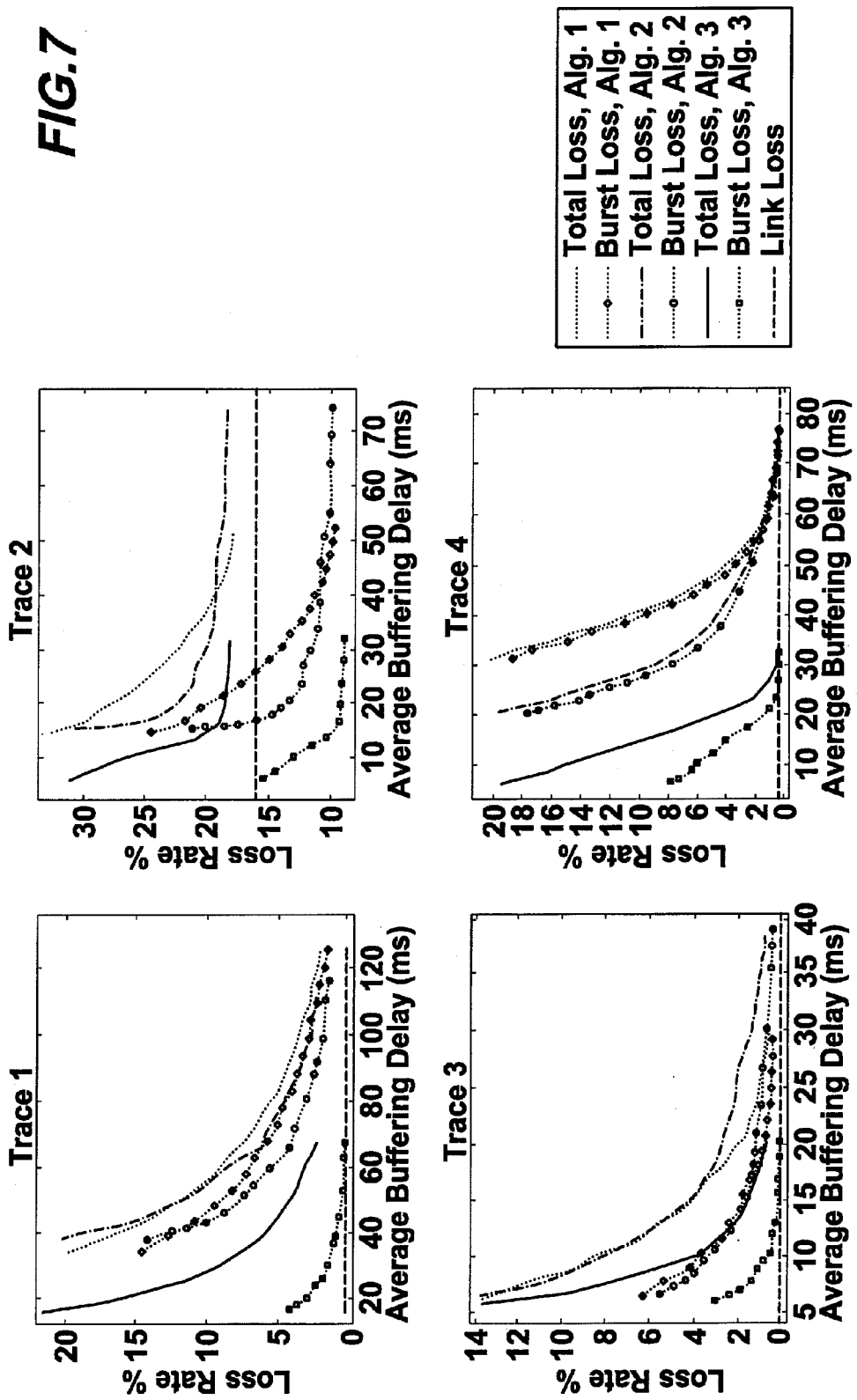
FIG. 7 is a graphical representation comparing an average buffering delay for three different playout scheduling schemes.

FIG. 7 shows the total loss rate ($\epsilon$) and the burst loss rate ($\epsilon_b$) that can be achieved for a given average buffering delay ($d_b$). The link loss rate ($\epsilon_n$) is shown by a horizontal dashed line, which sets the lower bound for $\epsilon$. Additional loss is caused by late loss, which is under control of the playout scheduling scheme. Hence, given $\epsilon = \epsilon_n + \epsilon_l$, FIG. 7 implicitly includes the late loss rate $\epsilon_l$ for evaluation.

In all cases, the playout scheduling scheme of the invention results in the lowest buffering delay for the same loss rate and hence outperforms the other two playout scheduling schemes. If targeting a late loss rate of 5% for Trace 1, the average buffering delay is reduced by 40.0 ms when using the playout scheduling scheme of the invention instead of the playout scheduling scheme shown in FIG. 1A. Comparing the playout scheduling scheme of the invention with the playout scheduling scheme shown in FIG. 1B the gain is still 31.5 ms. Similarly, for Traces 2, 3 and 4, the gain of the playout scheduling scheme of the invention over the playout scheduling scheme shown in FIG. 1A is 20.7 ms, 4.3 ms, and 28.0 ms respectively; and the gain over the playout scheduling scheme shown in FIG. 1B is 11.8 ms, 4.4 ms, and 20.0 ms respectively.

On the other hand, if allowing the same buffering delay for different algorithms, the playout scheduling scheme of the invention also results in the lowest loss rate. For the example of Trace 1, if the same 40 ms buffering time is consumed, the total loss rate resulting from playout scheduling scheme of the invention is more than 10% lower than that from the playout scheduling schemes shown in FIGS. 1A and 1B. Similar reductions in loss rate are also obtained in Traces 2, 3, and 4.

More importantly, the burst loss rate also drops when using the playout scheduling scheme of the invention. For Trace 1, by using the playout scheduling scheme of the invention, the burst loss rate drops from 12% to 1% at 40 ms buffering delay. As discussed above, burst loss significantly impairs voice quality even if its rate is as low as 5%. Even for Trace 3, where the gain from the playout scheduling scheme of the invention in terms of late loss rate and buffering delay is the smallest, the burst loss rate is 3.9% lower at 10 ms buffering delay.

The performance gain of the playout scheduling scheme of the invention over the playout scheduling schemes shown in FIGS. 1A and 1B depends on the characteristics of the trace. Naturally, when the network delay has no variations or unpredictable variations there is no room for improvement. For example, the link between Stanford and MIT has large bandwidth, resulting in the mildest delay variations for Trace 3 and hence the lowest gain for the playout scheduling scheme of the invention. The gain is most significant when the range of delay values is big and the correlation between packet delays allows a good estimate based on the past w packets.

The adaptive playout scheduling scheme of the invention estimates the network delay based on short-term order statistics covering a relatively small window, e.g., the past 35 packets. In the case of delay spikes, a special mode is used to follow delay variations more rapidly. Given the estimate, the playout time of the voice packets is adaptively adjusted to the varying network statistics. In contrast to the prior art, the adjustment is not only performed between talkspurts, but also within talkspurts in a highly dynamic way. Proper reconstruction of continuous playout speech is achieved by scaling individual voice packets using a Single Packet WSOLA algorithm that works on individual packets without introducing additional delay or discontinuities at packet boundaries. Results of subjective listening tests show that the DMOS score for this operation is between inaudible and audible but not annoying. This negligible quality degradation can also be observed for extreme network conditions that require scaling ratios of 35-230% for up to 25% of the packets.

Simulation results based on Internet measurements show that the trade-off between buffering delay and late loss can be improved significantly. For a typical buffering delay of 40 ms, the late loss rate can be reduced by more than 10%. More importantly, the playout scheduling scheme of the invention is very well suited to avoid the loss of multiple consecutive packets, which is particularly important for loss concealment. For example, the burst loss rate can be reduced from 12 to 1% at 40 ms buffering delay, which results in significantly improved audio quality.

An embodiment of the invention includes a WSOLA based loss concealment technique to combat loss, and work together with adaptive playout scheduling. Compared to the prior art, the proposed scheme operates at very low delay, i.e., one packet time, and can handle various loss patterns more effectively. The loss concealment method of the invention can take advantage of the flexibility provided by adaptive playout, and hence, the use of time-scale modification for adaptive playout scheduling integrating seamlessly into the overall system.

Although the invention is disclosed by the preferred embodiment, it is not intended to limit the invention. Those knowledgeable in the art can make modifications within the scope and spirit of the invention which is determined by the claims below. By way of example, the methods of the invention can be used in applications other than VoIP such as streaming audio, streaming video, the audio component of streaming multimedia, and music. In the case of streaming video, those skilled in the art will recognize that media scaling may be accomplished by adjusting a frame rate rather than using time-scale modification.

We claim:

1. A method of adapting a playout schedule of a stream of media packets according to network and channel conditions, the method comprising:
   (a) setting a playout schedule for a next packet i+1 of the stream upon receiving a current packet i;
   (b) computing a length of the current packet i based at least in part on a target playout schedule for the next packet i+1;
   (c) scaling packet i if necessary;
   (d) outputting packet i; and
   (e) updating the playout schedule for next packet i+1 based at least in part on the playout schedule and the length of current packet i.

2. The method of claim 1, further comprising repeating steps (a) through (e) for additional packets of the stream.

3. The method of claim 1, wherein step (a) comprises estimating the delay of the next packet i+1 and setting the playout schedule for the next packet i+1 based at least in part on the delay.

4. The method of claim 3, wherein estimating the delay comprises using past network delay statistics.

5. The method of claim 3, wherein if the estimated delay of the next packet i+1 is high, the playout schedule for the next packet i+1 is set later to avoid packet loss.

6. The method of claim 3, wherein if the estimated delay of the next packet i+1 is low, the playout schedule for the next packet i+1 is set sooner to reduce buffering delay.

7. The method of claim 1, wherein the playout schedule for next packet i+1 is set such that an expected loss rate of next packet i+1 is not greater than a user-defined value.

8. The method of claim 1, wherein step (c) comprises either expanding, compressing or leaving intact current packet i based on one or more comparisons between a target packet length and one or more thresholds.

9. The method of claim 1, wherein step (c) comprises comparing a difference between a target packet length and at least one of an expansion threshold and a compression threshold in order to determine whether or not to scale current packet i.

10. The method of claim 9, wherein step (c) comprises scaling current packet to a target length if it is determined that current packet i should be scaled.

11. The method of claim 10, wherein scaling current packet i to a target length comprises scaling an audio packet using a time-scale modification technique that modifies a playback rate of the audio packet.

12. The method of claim 10, wherein scaling current packet i to a target length comprises scaling an audio packet using a time-scale modification technique that does not modify the pitch of the audio.

13. The method of claim 10, wherein scaling current packet i to a target length comprises ensuring a continuous media output with no gap or overlap while satisfying the playout schedule of step (a).

14. The method of claim 1, wherein steps (a) through (e) comprise adaptively setting the playout schedule according to monitored channel delay statistics.

15. The method of claim 1, wherein steps (a) through (e) comprise setting the playout schedule during both periods of silence and talkspurts.

16. The method of claim 1, wherein steps (a) through (e) comprise setting the playout schedule and scaling the current packet i on a packet by packet basis.

17. The method of claim 1, wherein steps (a) through (e) comprise scaling current packet i such that current packet i can have a different length.

18. The method of claim 1, further comprising concealing a loss of next packet i+1 if next packet i+1 is not received by a time current packet i is output in step (e).

19. The method of claim 18, further comprising concealing the loss using a time-scale modification technique without modifying a pitch of an audio packet.

20. The method of claim 18, further comprising concealing the loss by extending the current packet i with an expanded target length and outputting an extended packet i at its playout time.

* * * * *

UNITED STATES PATENT AND TRADEMARK OFFICE
CERTIFICATE OF CORRECTION

PATENT NO. : 7,324,444 B1
APPLICATION NO. : 10/383215
DATED : January 29, 2008
INVENTOR(S) : Liang et al.

Page 1 of 1

It is certified that error appears in the above-identified patent and that said Letters Patent is hereby corrected as shown below:

Col. 4, line 16: " $\mathcal{R} = \{i | t_p^i > t_r^i\}$ " should read -- $P = \{i | t_p^i > t_r^i\}$ --

Col. 4, line 16: " $|\mathcal{R}|$ " should read -- $|P|$ --

Col. 4, line 18: " $\epsilon_I = (|\mathcal{R}| - |\mathcal{R}|)/N$ " should read -- $\epsilon_I = (|\mathcal{R}| - |P|)/N$ --

Col. 4, line 29: " $\mathcal{B} = \{i | t_p^i < t_r^i, t_p^{i+1} > t_r^{i+1}\}$ " should read -- $\mathcal{B} = \{i | t_p^i < t_r^i, t_p^{i+1} < t_r^{i+1}\}$ --

Col. 14, line 24, Claim 10: "packet to" should read -- packet i to --

Signed and Sealed this
Twenty-seventh Day of December, 2011

David J. Kappos
*Director of the United States Patent and Trademark Office*